Nov. 6, 1945.    M. BERKOW    2,388,247
AIRPLANE
Filed Nov. 22, 1940    2 Sheets-Sheet 1
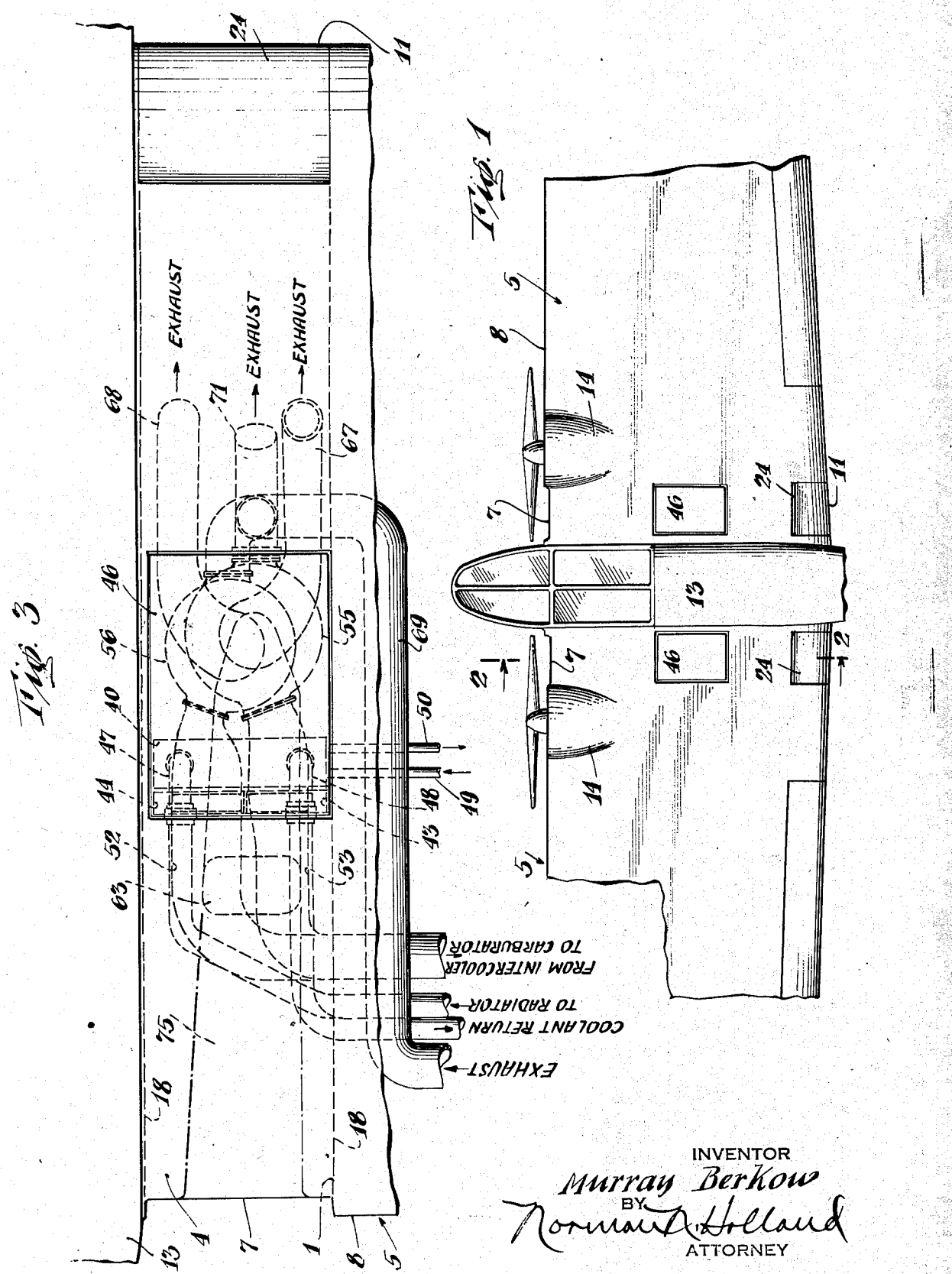
INVENTOR
Murray Berkow
BY
Norman A. Holland
ATTORNEY

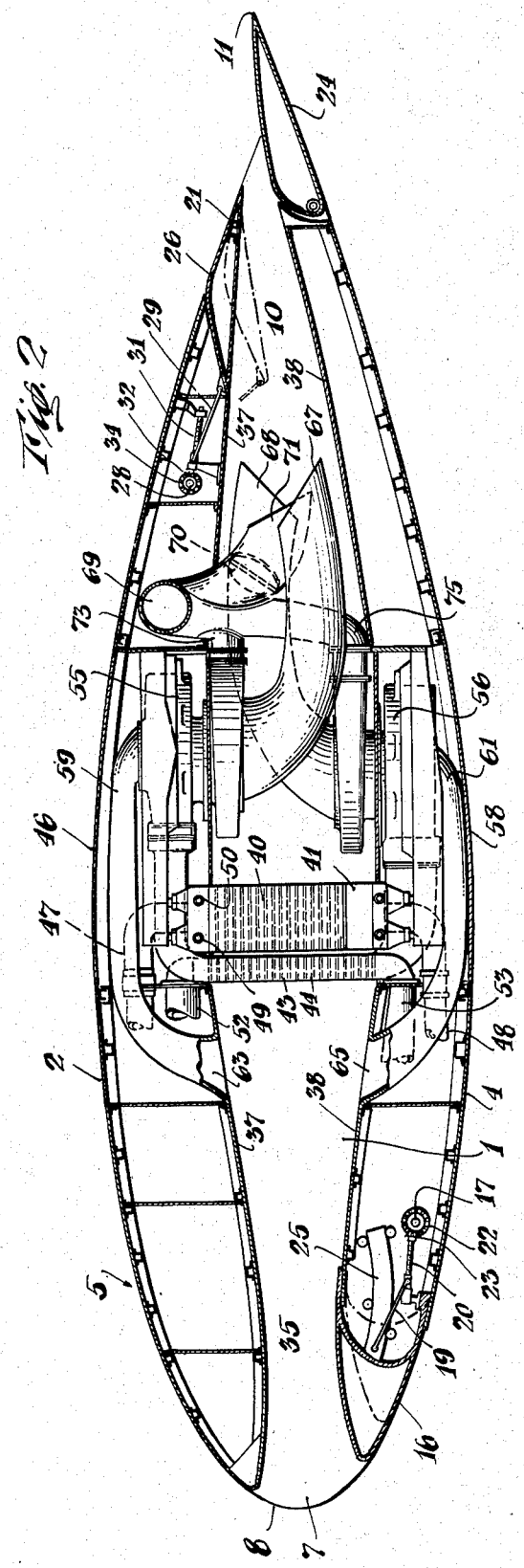
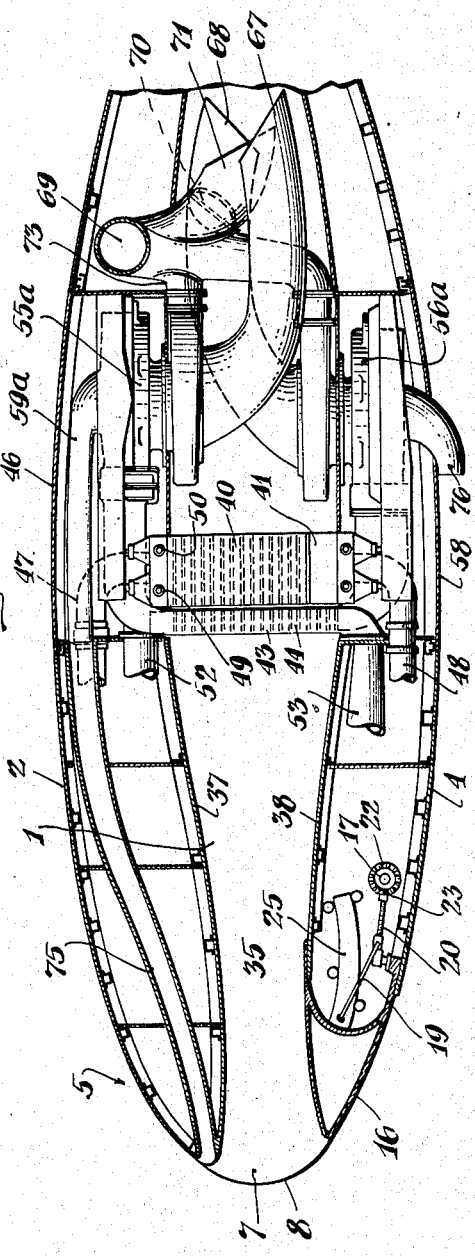

Patented Nov. 6, 1945

2,388,247

UNITED STATES PATENT OFFICE 2,388,247

AIRPLANE

Murray Berkow, New York, N. Y., assignor to Central Aircraft Corporation, Keyport, N. J., a corporation of Delaware Application November 22, 1940, Serial No. 366,533

12 Claims. (Cl. 244—53)

The present invention relates to aircraft and more particularly to a new and improved means and construction adapted to increase the efficiency, speed and propulsive effect of airplanes.

Airplane designers and manufacturers are continually striving to increase, in various ways, the efficiencies and speeds of their planes. One of the chief methods employed is to minimize air resistance or "drag" by the streamlining of parts or fitting parts into the plane structure in various ways. Liquid cooled engines possess, in general, smaller frontal areas than air cooled engines of the same horsepower, but they also require radiators for cooling the liquids utilized with them. Where an airplane is designed for high altitude flying the problem is further complicated by the necessity of providing superchargers for compressing the rarified air so that it may be delivered in proper quantities to the engine carburetors. These superchargers are generally driven by the exhaust gases from the engine and must be cooled in order to operate most effectively; cooling them in an air stream increases the resistance to forward movement of an airplane.

The present invention aims to minimize or overcome the above and other difficulties and to increase the effectiveness of the propulsive or driving force for an airplane by providing new and improved means for cooling the engine, superchargers therefor, and the like with a minimum increase in air resistance and to utilize the air cooling stream and the engine exhaust to reduce the drag on the wings and to impel the plane forward.

An object of the present invention is to provide means adapted to increase the speed of an airplane.

Another object of the invention is to provide means adapted to decrease the resistance to movement of an airfoil through the atmosphere.

Another object of the invention is to provide means adapted to increase the propulsive effect operative to move an airfoil through the atmosphere.

Still another object of the invention is to provide means adapted to supply a greater quantity of air to a supercharger.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a fragmentary plan view of an airplane showing one location for the preferred embodiment of the invention;

Fig. 2 is a sectional view along line 2—2 of Fig. 1;

Fig. 3 is a fragmentary plan view of the construction illustrated in Fig. 2; and Fig. 4 is a fragmentary sectional view similar to that of Fig. 2, but illustrating a modified form of the invention.

Referring more particularly to the drawings there is shown a preferred embodiment of the present construction for increasing the efficiency and speed of an airplane. While the embodiment is shown applied to a twin engine airplane, it will be clear that a similar arrangement and construction may be used equally as well with a plane having any number of engines. The present embodiment will be described with reference to liquid cooled engines, but it will be clear that certain of the features thereof are equally applicable to air cooled engines.

The preferred embodiment of the invention comprises a wing or airfoil having a duct or air stream passage 1 located between the upper and lower surfaces 2 and 4 of the wings 5 of an airplane, having an entrance portion 7 adjacent the leading edge 8 of a wing and adjacent the stagnation point of the airfoil to provide an air stream in the duct 1; a duct exit portion or slot 10 is located adjacent the trailing edge 11 of the wing or airfoil. Also, the duct 1 is shown located intermediate an airplane fuselage 13 and engine 14, but it will be clear that it may be placed at any other convenient position in the wing. The effective size of the entrance or intake portion 7 of the duct 1 is preferably adjustably controlled by a means of a movable member 16 which connects with a curved projecting member 25 secured to the movable member 16. The curved projecting member 25 facilitates guiding the movable member 16 from retracted to advanced position, and vice versa. Movement of the entrance controlling member 16 may be controlled by a shaft 17 through gears 22 and 23, threaded shaft 20, and link 19.

The effective size of the exit portion 10 of the duct 1 is preferably adjustably controlled by means of a movable exit controlling member 26 which connects with a controlling shaft 28 through a link 29, threaded shaft 31 and gears 32 and 34. The exit controlling member 26 is preferably pivoted or hinged at a point 21 adjacent its rearward edge so that the forward edge thereof may be moved downwardly into the duct to divide or separate the air stream which passes through the duct. Dividing the air stream emerging from the duct and causing part of it to pass over the exit member 26 and part of it to pass under the exit member 26 is advantageous for it may be used to control and reduce the vacuum or negative pressure area which tends to occur at the upper surface of and adjacent this part of the wing, as will be further described hereinafter. Locating the exit slot at approximately eighty-five percent of the chordal length of the wing, measured from the leading edge of the wing gives good results. A separate controllable vane 24 may also be provided at the exit of the duct 1.

If desired, the members 16 and 26 which control the effective sizes of the entrance and exit openings 7 and 10 of the duct 1 may be synchronized so that changes at each end of the duct 1 may be made simultaneously.

The duct 1 may be substantially in the shape of a Venturi tube (Fig. 2) with a constricted throat 35 spaced rearwardly from the leading edge 8 of the wing. Behind the throat portion 35 the duct enlarges considerably in cross-section, preferably equal to or greater than twice the cross-sectional area at the constricted throat 35. The side walls 18 of the duct 1 may be straight for the length of the duct while the top and bottom walls 37 and 38, respectively, are smoothly and gently curved to provide a Venturi tube and to insure streamline flow of air through the duct. Due to the enlarged cross-section of the duct behind the throat 35 and the consequent increase in size of the duct, the air stream passing therethrough will move at a lower speed than when passing through the reduced throat 35; the air passing through the large portion will move approximately one-half as fast as that moving through the throat 35 if the ratio of throat cross-section to enlarged portion cross-section is one to two. It will be understood that any other desired ratio of areas may be used. Also, as the velocity of the air stream is decreased at the enlarged portion, the pressure therein tends to increase. The velocity of the air in the duct will differ from the velocity of the free air stream depending upon the above factors or any other factors which it is not necessary to discuss herein.

A liquid cooling means is located within the duct 1, adjacent the enlarged portion thereof where the air stream velocity is at a minimum. The liquid cooling means comprises, in the present embodiment, a radiator 40 for cooling the liquid which circulates through the engine, an oil cooling radiator 41, and radiators 43 and 44 for cooling the air to be delivered to the engine carburetors. It is preferred to position the radiators which cool the air going to the carburetors, hereinafter referred to as the intercoolers, nearest to the front of the duct 1 and to place the liquid cooling radiator and oil cooling radiator behind the intercoolers. This is desirable for the reason that the rise in temperature of air passing over the intercoolers is small and does not appreciably affect the cooling of the radiators located behind the intercoolers. To facilitate construction, installation and maintenance, it is desirable to manufacture the fluid cooling means as a unit, the unit being removable through a detachable top panel 46 located in the upper surface 2 of the wing or airfoil. Since the fluid cooling means is located in the enlarged portion of the duct where the velocity of the air stream is a minimum, the resistance to movement of the radiator through the air stream, commonly referred to as the drag, will be greatly decreased, the drag varying approximately as the square of the speed of an object with respect to the air through which it is moving.

The fluid pipe lines coming from and going to the engine, namely liquid pipe lines 47 and 48 and oil pipe lines 49 and 50, and the air pipe lines 52 and 53 going from the intercooler to the carburetor, are preferably located above or below the upper and lower walls 37 and 38 of the duct so that they extend between the duct walls and the outside contours of the wing or airfoil section and provide an unobstructed duct for the passage of air to the cooling units.

Superchargers 55 and 56 are located behind the fluid cooling means and are adapted to receive atmospheric air and compress it for delivery to the intercoolers 43 and 44 and thence to an engine carburetor. Two turbo superchargers 55 and 56 driven by exhaust gases from an engine are shown in the present embodiment, but the construction is not limited to any particular number of them. Installation and removal of the superchargers is facilitated by making them accessible through a detachable bottom panel 58 located in the undersurface 4 of a wing or airfoil. The air inlets 59 and 61 to the superchargers 55 and 56 (Fig. 2) preferably comprise passages which connect with airfoil duct 1 at a point in advance of the fluid cooling means and at a point where the pressure tends to be greater than that at the throat 35 of the duct. These supercharger passages 59 and 61 may terminate at their mouths in separate pipes having inlets at 63 and 65, respectively, or they may terminate in an annular ring or channel-shaped entrance which extends entirely about the duct. The air pressure in the duct is generally sufficient to supply air to the superchargers through the passages therefor and it is not necessary to utilize air scoops at the inlets, but they may be provided if desired.

The exhaust gases from the engine are utilized to rotate the superchargers and are conducted thereto through a main pipe line 69 having branches 73 and 75 leading to each of the superchargers. Excessive amounts of exhaust gases not required to drive the superchargers are permitted to pass out of the main pipe line 69 through a rearwardly curved tail pipe 71, which discharges the gases into the wing duct 1. The tail pipe 71 is provided with a waste gate control 70 adapted to be set at different positions so as to control the back pressure in the main pipe line 69 and the quantities of the exhaust gases going through the branch lines 73 and 75 to the superchargers. After passing through and rotating the superchargers, the exhaust gases therefrom are discharged into rearwardly turned tail pipes 67 and 68 which likewise discharge into the duct 1. The tail pipes minimize the danger of ignition or "after burning" of any partially consumed gases while in the wing duct 1.

The heat from the fluid cooling means and the hot exhaust gases discharged into the duct 1 from the superchargers and the engine raises the temperature of the air passing through the duct and greatly increases its volume. This expanded volume of air combined with the volume of exhaust gases rushing at high velocity out of the exit end of the duct provides an impelling effect or driving force which tends to urge the airfoil forwardly. There is thus provided a jet propulsion effect. The exit slot 10 from the airfoil duct 1 is preferably located at the upper surface of the wing at a negative pressure region where the exhaust from the duct does not injuriously affect to any great extent the air stream flowing past the external surfaces of the wing. The flow of the air and exhaust gas stream out of the duct 1 is guided by means of the shape of the exit slot so that the exit flow is tangential to the flow of air past the outside surface of the airfoil. The speed of the stream emerging from the duct is also slightly greater than that of the air flowing past the airfoil. An advantage of this feature is that it tends to reduce the boundary layer of air on the airfoil and to straighten the air flow which passes the airfoil surfaces; this tends to reduce drag on the airfoil and to increase the lifting effect. As pointed out hereinabove the passage of the air stream out of the duct exit may be controlled by varying the position of the exit controlling member 26. In this manner the air stream may be divided or split to cause part of it to pass over the exit controlling member 26 to the upper rear surface of the wing to reduce the negative pressure area which may tend to occur adjacent this part of the wing.

In Fig. 4 there is shown a modified form of the invention wherein the air inlet to one of the superchargers 55a comprises a passageway 59a which extends from a point adjacent the leading edge 8 of an airfoil to the supercharger and has air forced or rammed into it due to forward movement of the airfoil through the air. This forcing or ramming of the air into the supercharger intake 59a partially compresses the air and decreases the work which must be done by the supercharger in compressing it for delivery to an engine. The inlet to the other supercharger illustrated in Fig. 4 comprises an air scoop 76 which projects outwardly beyond the surface of the airfoil and scoops up air to force or ram it to the supercharger 56a connected therewith. Either the air passage 59a or the air scoop 76 may be used separately with a supercharger, or the air scoop may be utilized with the supercharger 55a and an air passage 59a with the supercharger 56a.

It will be seen that the present invention provides for the mounting in a single duct of the various cooling means, with improved means for conducting air to the superchargers and with energy recovery from the heated air stream and hot exhaust gases. Air resistance or drag is minimized by the mounting of the fluid cooling means and superchargers in the duct in the manner described, and these parts are insured of obtaining an ample supply of air at all times. Since the air going to the superchargers is already under pressure, due to withdrawing it from a pressure area of the duct or to ramming it into the intakes, the amount of work required to be done by the supercharger in compressing the air is decreased. In addition, the exit controlling means for the main duct may be moved inwardly into the duct to divide the emerging stream of air and gas and direct a portion of it to the upper surface of the wing so as to minimize objectionable negative pressure area.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An airfoil having a duct therein with an enlarged portion adapted to reduce at a portion thereof the velocity of an air stream passing therethrough, a supercharger unit at least partly in said duct, tail pipes connected with the exhaust from said supercharger unit and from the engine and extending to positions adjacent the rear of said duct adapted to conduct and discharge exhaust gases, and a passage for supplying air to said supercharger unit.

2. In an airplane, the combination of a pair of wings, an engine carried by each of said wings, a duct extending from the forward edge of each wing rearwardly through each of the wings, means for varying the sizes of the inlet ends of said ducts, said ducts having enlarged portions adapted to reduce the velocity of the air passing through said enlarged portions, a radiator mounted in each of the enlarged portions of said ducts, a turbo-supercharger unit at least partly in the enlarged portions of each of said ducts at a point rearward of the radiator therein, means for supplying air to the supercharger units, means for delivering the exhaust of the engines to the said ducts at portions rearward of the supercharger unit to create an impelling effect at the outlet ends of the ducts, means for varying the area of the outlet ends of said ducts, and means for directing a portion of the stream passing through said ducts to the upper sides of the wings at a point adjacent the rear edge thereof to minimize the "drag" occasioned by said portions of the wings.

3. In an airplane, the combination of a pair of wings, an engine carried by each of said wings, a duct extending from the forward edge of each wing rearwardly through each of the wings, means for varying the sizes of the inlet ends of said ducts, said ducts having Venturi-shaped throats and enlarged portions beyond the throat adapted to reduce the velocity of the air passing through said enlarged portions, a radiator for an engine mounted in each of the enlarged portions of said ducts, a radiator for cooling the engine oil mounted in the enlarged portion of each of the ducts, a supercharger unit mounted in the enlarged portions of each of said ducts at a point rearward of the radiators therein, means for supplying air to the supercharger unit, means mounted adjacent the said radiators for cooling the air delivered by the supercharger units to the engine, means for delivering the exhaust of the engines to the said ducts at portions rearward of the supercharger units to create an impelling effect at the outlet ends of ducts, means for varying the effective areas of the outlet ends of said ducts, and means for directing a portion of the stream passing through said ducts to the upper sides of the wings at a point adjacent the rear edge thereof to minimize the "drag" occasioned by said portions of the wings.

4. An airplane wing having a duct opening at its entrance end through the leading edge of the wing and extending through the wing with its outlet through the upper surface of the wing at the trailing edge thereof to minimize the drag occasioned by said portion of the wing, said duct having a constricted throat with an enlarged entrance and with an enlarged portion located behind the constricted throat adapted to decrease the velocity of the air stream passing through the enlarged portion of the duct, fluid cooling means mounted at the rear of the throat in the enlarged portion of the duct, an exhaust gas driven supercharger unit mounted at least partly in said duct at the rear of the throat in said enlarged portion and tail pipes connected with the exhaust from the engines and from the supercharger unit to discharge exhaust gases into said duct to the rear of the supercharger and at a point adjacent the rear of the duct.

5. An airplane wing having a duct opening at its entrance end through the leading edge of the wing and extending through the wing with its outlet through the upper surface of the wing at the trailing edge thereof to minimize the drag occasioned by said portion of the wing, said duct having a constricted throat with an enlarged entrance and with an enlarged portion located behind the constricted throat adapted to decrease the velocity of the air stream passing through the enlarged portion of the duct, means for changing the size of the opening of the duct at the leading edge of the wing, an engine radiator mounted at the rear of the throat in the enlarged portion of the duct, an exhaust gas driven supercharger unit mounted at least partly in said duct at the rear of the throat in said enlarged portion and tail pipes connected with the exhaust to discharge exhaust gases from the engine and from the supercharger unit into said duct to the rear of the supercharger unit at a point adjacent the rear of the duct.

6. An airfoil for an airplane having a duct opening at its entrance end through the leading edge of the airfoil and extending through the upper surface of the airfoil at the trailing edge thereof, said duct having an enlarged entrance, with a constricted throat portion adjacent the entrance and with an enlarged portion located behind the constricted throat adapted to decrease the velocity of the air stream passing through the enlarged portion of the duct, a plurality of cooling devices mounted in the enlarged portion of said duct adjacent a portion where the velocity of said air stream passing through the duct is at a minimum and an exhaust gas driven supercharger unit at least partly in said duct behind the fluid cooling devices, and a tailpipe connected with the exhaust from the supercharger adapted to discharge exhaust gases in a downstream direction into said duct at a point adjacent the rear of the duct.

7. An airplane wing having a duct extending therethrough and comprising an inlet through the leading edge of the wing, means for movably mounting an edge portion of the wing forming a portion of the inlet to vary the size of the inlet, a constricted throat and an enlarged portion behind said throat, fluid cooling means in the enlarged portion of said duct beyond the throat, a turbo-supercharger unit positioned at least partly in said duct behind the fluid cooling means, and a passage connecting the intake of said supercharger unit with an inlet in the side of said duct forwardly of the fluid cooling means to minimize drag and to conduct air from said inlet to the supercharger unit.

8. An airfoil having a duct therein comprising a constricted throat and having superimposed inlets through the leading edge of the airfoil, one leading to the throat and the other to the supercharger unit, an enlarged portion in said duct behind said throat, a supercharger unit partly in said duct, and a passage connecting the inlet for the supercharger unit with said supercharger unit, whereby a portion of an air stream impinging on the leading edge of said airfoil is forced through said passage into said supercharger unit with a minimum increase in drag.

9. A wing for an airplane having a main air duct having an entrance through the forward edge of the wing and extending through the wing to the rear thereof, means including a movably mounted portion of the forward edge forming a part of the inlet for varying the size of the inlet through the leading edge of the wing, the path of the outer surface of said varying means following along the outer contour of the wing to minimize the drag on the wing due to changes in the position thereof, said duct having an enlarged portion beyond the inlet and an outlet through the upper surface of the wing at the trailing edge thereof, a plurality of heat exchange units in said enlarged portion some of which are arranged in series relation, a supercharger unit at least partly in said enlarged portion at a point beyond the heat exchange units, whereby the cooling air passes over certain of the units in sequential order, a passage for supplying air to said supercharger unit and means for varying the effective size of said outlet through the upper surface of the wing.

10. In an airplane, the combination of a pair of wings, an engine fixedly carried by each of said wings, a duct having an inlet through the forward edge of each wing and extending rearwardly through the wing, with an outlet through the upper surface of the wing adjacent the trailing edge thereof, to minimize the drag occasioned by said portion of the wing, means including movably mounted portions of the forward edge of each wing constituting parts of the inlet ends for varying the sizes of the inlet ends of said ducts, said ducts having enlarged portions adapted to reduce the velocity of the air passing through said enlarged portions, a plurality of heat exchange units in said enlarged portions of said ducts some of which are arranged in series relation, a supercharger unit at least partly in the enlarged portions of each of said ducts at a point rearward of the heat exchange units therein, whereby the cooling air passes over certain of the units in sequential order, means for supplying air to said supercharger unit and means for delivering the exhaust of the supercharger unit and of the engine to said ducts in a downstream direction at portions rearward of the supercharger to create an impelling effect at the outlet end of the duct.

11. An airplane wing having a duct extending substantially transversely therethrough, a turbo-supercharger unit, at least partly in said duct, an engine radiator mounted in said duct forwardly of said supercharger unit, means for adjusting the area of the entrance end of said duct, a pipe opening into the rearward portion of said duct for conducting the engine exhaust thereto, said duct having an exit portion terminating in an exit slot, an adjustable member adjacent said exit slot having a front portion adapted to be moved into the duct so that the front edge thereof projects inwardly and means for moving said adjustable member to divide an air stream coming from the duct and direct a portion thereof to the upper surface of the wing.

12. An airplane wing having a duct extending substantially transversely therethrough, a turbo-supercharger unit at least partly in said duct and discharging hot gases in said duct, a radiator for the airplane engine in said duct forwardly of the supercharger unit and a radiator mounted in the duct forwardly of the engine radiator for cooling the air delivered by the supercharger.

MURRAY BERKOW.